L. L. IRVIN.
SAFETY PACK PARACHUTE DEVICE.
APPLICATION FILED JAN. 18, 1919.
1,323,984.
Patented Dec. 2, 1919.
2 SHEETS—SHEET 1.
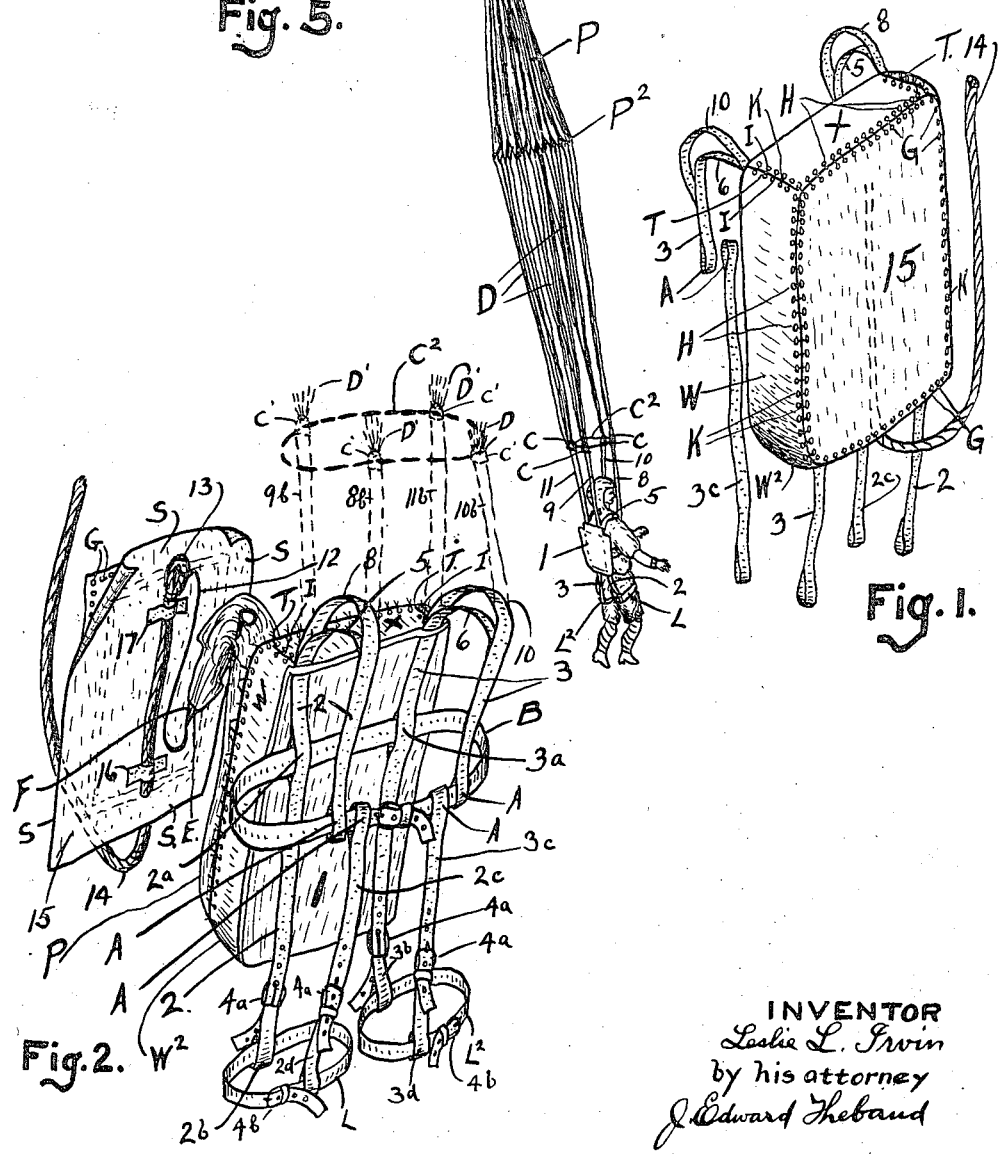

L. L. IRVIN.
SAFETY PACK PARACHUTE DEVICE.
APPLICATION FILED JAN. 18, 1919.
1,323,984.
Patented Dec. 2, 1919.
2 SHEETS—SHEET 2.
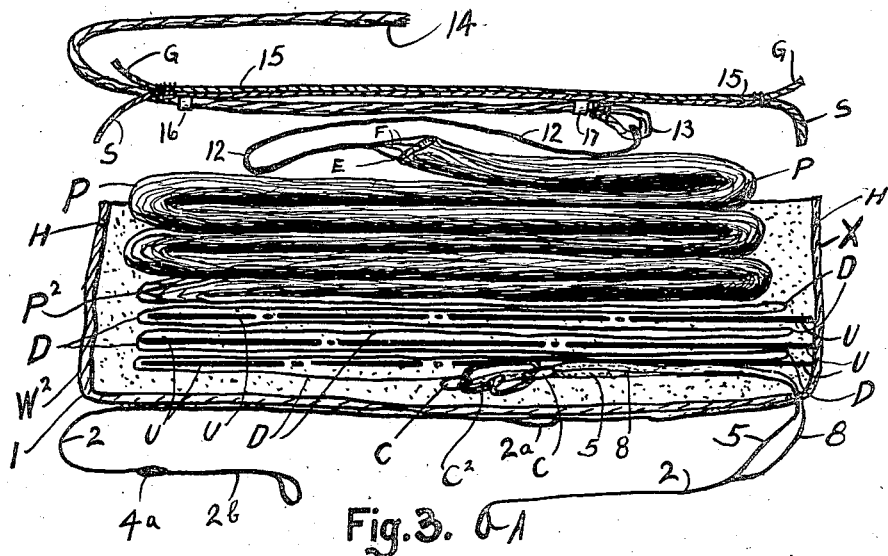
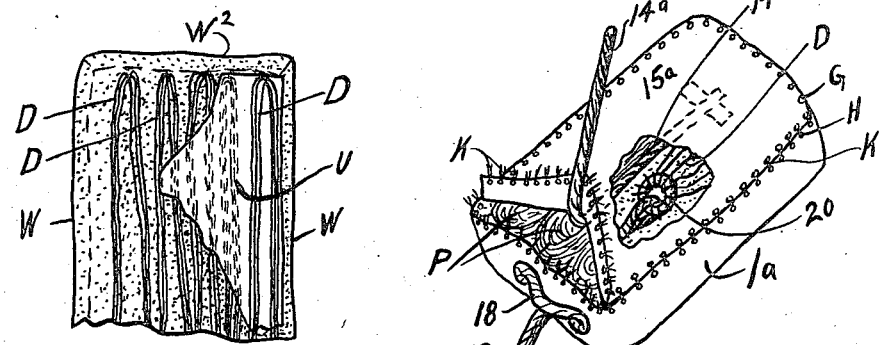
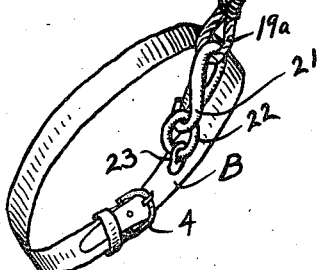
INVENTOR
Leslie L. Irvin,
by his attorney,
J. Edward Thebaud.

UNITED STATES PATENT OFFICE.

LESLIE L. IRVIN, OF KENMORE, NEW YORK.

SAFETY-PACK PARACHUTE DEVICE.

1,323,984.     Specification of Letters Patent.     Patented Dec. 2, 1919.

Application filed January 18, 1919. Serial No. 271,905.

*To all whom it may concern:*

Be it known that I, LESLIE L. IRVIN, a citizen of the United States, residing at Kenmore, in the county of Erie and State of New York, have invented certain new and useful Improvements in Safety-Pack Parachute Devices; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to safety pack parachute devices, particularly to that kind which includes the systematically packed parachute and connections in a neat sack.

One of the objects of my invention is to provide a dependable life preserver for an aviator, which, in addition to serving as a parachute, will be automatically releasable at the proper place and instant desired to insure the safe launching of the aviator from his abandoned airship, without entanglement with itself or by collision with the aircraft.

Another object is to provide a safety parachute pack device, including a parachute with attaching means to be used at will or to be fixed upon the body of the aviator, by way of a harness, to support the pack upon his back, at the same time having his body attached to the parachute within the pack, providing a device for ready and instant automatic use, when he jumps away from his machine.

A further object is to provide a means and a method of packing and handling a parachute, which will keep the large peripheral edge of the parachute gathered together and concealed from air currents until the parachute has become fully extended by being pulled by the top attachment to the air-ship during the descent of the aviator, to insure the full opening of the parachute at a safe distance from the air-ship, thus avoiding entanglement therewith. Accidents have been known to be caused by the premature opening of a parachute next to the air craft in a manner to prevent the proper functioning of the parachute bag.

An additional object of my invention is to provide means which will permit of packing the parachute in a manner to have the said means pulled away from the parachute, having its top attached to the air-ship, on account of the fixing of the sack of the pack upon the body of the falling aviator. No claim is made in the present application to the parachute pack comprising the sack having the detachable cover and the parachute foldable within the sack and attached to the cover and to the aviator holding means, whereby the parachute is unfolded from the sack upon the descent of the aviator from the air-ship, as the claims of the present application are restricted to the particular form of the aviator holding means, while generic claims to the invention are in applicant's copending application, Serial No. 267,065, filed December 16, 1918.

A further object is to provide a simple parachute pack device of light and strong construction which shall be automatically openable by the fall of the aviator from the air-ship.

A further object is to provide a harness for attaching the said device to the aviator which shall not only permit of freedom of movement within his machine but which shall comfortably support his body in suspension during his descent with the parachute.

Another object of this invention is to provide a method of folding the suspension cords of the parachute, and at the same time keep the various folds of these cords separated to facilitate their natural unfolding without entanglement, as they leave the containing case.

With these and other objects, my invention resides in certain construction of pack devices and contents, beside the method of packing the parachute and attachments for the use of the aviator as a life preserver, all of which is illustrated in the drawings, is hereinafter described, the method of packing is explained, together with its use and what I claim is set forth.

In the drawings,

Figure 1 is a perspective view of a safety pack with attachments embodying my invention.

Fig. 2 is a perspective view of a like pack with attachments, to the one shown in Fig. 1, but here shown having the cover removed and spaced from the body of the pack, illustrating the attachments thereto and the parachute, besides the body harness, which in use is fixed to the aviator as shown in Fig. 5.

Fig. 3 is a sectional side elevation of a loosely packed sack, attachments, and contents, showing the manner of folding the parachute, its connection with the cover of the sack and the manner of packing the suspension cords of the parachute.

Fig. 4 is a fragmental plan, showing part of the suspension cords and separators.

Fig. 5 is a perspective view of an aeroplane showing the aviator in the act of descending and breaking away from the air craft, while he remains attached to the parachute, in its extended position, which the parachute takes automatically, as the aviator falls away from the machine.

Fig. 6 is a modified form of pack and devices partly opened and shown in perspective view; a form of pack particularly designed for the use of the aviator's mechanic or observer, and designed to be attached at the time this assistant desires to leave the air-ship.

Referring to the construction illustrated in Figs. 1 to 5 inclusive, particularly to Fig. 2, there is shown sewed to the canvas bag 1, two canvas straps 2 and 3, each extending beyond the bag in both directions, the lower ends terminating in the respective strap extensions $2^b$ and $3^b$ which are adjustably attached by buckles $4^a$, $4^a$. The upper portions of the straps 2 and 3 are turned down and terminate in loops A, A through which pass the belt B having a buckle 4. Depending from the belt B are other straps $2^c$ and $3^c$ which also have loops A, A. These straps $2^c$ and $3^c$ terminate below in extensions $2^d$ and $3^d$ respectively which are adjustably attached by other buckles $4^a$, $4^a$. There are loops in the lower ends of the extensions $2^b$ and $2^d$ through which passes the big strap L having a buckle $4^b$. The other big strap $L^2$, with buckle $4^b$, is supported in loops in the strap extensions $3^b$ and $3^d$. The strap L and $L^2$ are buckled upon the aviator's legs near the hips while the upper parts of the straps 2 and 3 pass tightly over his shoulders. The shoulder portions 5 and 6 have pairs of extensions 8 and 9 and 10 and 11 respectively, which terminate in metal rings C, C, C, C, to which are attached the suspension cords D, D, D, D, of the parachute P.

Through the rings C, C, C, C, passes a flexible or rope ring $C^2$ which prevents the spreading of the rings C, C, C, C, beyond their relative position shown in Fig. 5 and in dotted lines in Fig. 2. The upper open ring E of the parachute P has several short cords F, F, F, attached to a single light rope 12, which in turn is tied to the looped end 13 of the strong rope 14. The rope 14 is firmly attached to the cover 15 of the bag 1 by means of the bands 16 and 17. The cover 15 has a series of eyelets G, G, G, near its edges and also has a skirting piece S, which is tucked into the bag 1 over its contents, the side walls W, W, and end wall $W^2$ of the bag 1, have eyelets H, H, H, which are joined to the eyelets G, G, G, by a light and breakable cord K, when the bag 1 is closed. The side and end walls W, W, $W^2$, of the bag 1, are made continuous, while the top wall X is separable from the walls W, W, at the slits T, T, the lips of which are provided with eyelets I, I, and are laced together with a light breakable cord $K'$. The strap extension 8, 9, 10 and 11 pass through openings at the base of slits T, T, in pairs, as they enter the bag 1 in connection with the packed parachute P, and its cords D, D, D. If desired the strap extensions 8, 9, 10 and 11 can be passed through the joint between the wall X and the cover 15 and the slits T, T, and be dispensed with.

Referring to the manner in which the parachute and attachments are packed in the bag 1, as shown in Fig. 3, wherein the cover 15 is shown removed and spaced from the bag 1 in connection with the packed parafluted and plaited together and is preferably made of strong light silk cloth, with strong silk suspension cords D, D, D, D. The strap extensions 8, 9, 10 and 11 with their rings C, C, C, are carefully laid inside the bag 1, against the same, and the cords D, D, are laid straight on the bottom of the bag 1. A layer of thin paper U, is next laid over the portion of the cords D, D, and the strap extension pairs 8 and 9, and 10 and 11, are passed through the bases of the respective slits T, T, and laid straight with their rings C, C, C, C, upon the bottom of the sack 1 in the direction of its length, having the end portions of the cords D, D, D, D, pulled straight over the end wall $W^2$. A sheet of thin paper U, is next laid flat upon the bottom of the sack 1, covering the rings C, C, C, C, the strap extensions 8, 9, 10 and 11, and the ends of the cords D, D, D, D. The cords D, D, D, D, are next drawn back over the first paper layer U, and carefully looped as shown in Fig. 4 and laid straight back to the paper edge next the end wall W, when another layer U of this paper is laid on top the first layer covering cord loops, after which other successive layers of cord loops and paper separators U, U, are laid on, having the cords turn over the edges of the paper separators, which adjoin the end wall W², until the peripheral edge of the parachute P is reached, when the parachute, which had been carefully plaited and gathered together in a long longitudinal fold, is laid back and forth upon itself as shown in Fig. 4, until the ring E is reached when the cord 12, firmly attached to the rope loop 13, is laid as shown in the Fig. 4, after which the cover 15 is placed on and pressed down, having the skirt edges S, S, S, S, tucked between the top of the walls X, W, W, W² and the parachute P and the eyelets H and G are laced together with an easily breakable cord K. The lips of the slots T, T, are also laced together with a like cord K and the completed pack presents the appearance shown in Fig. 1. The pack, in this condition, is next placed upon the back of the aviator with the harness in place about his shoulders and strapped to his legs by the big straps L and L² as shown in Figs. 2 and 5; vertical adjustment of the harness being made by the buckles 4ª, 4ª, 4ª, 4ª.

In operation, upon entering the air-ship the aviator fixes the rope 14 to some part thereof near where he sits when operating his machine. When he wants to jump out, he does so and the rope 14, by its attachment to the cover 15, rips the cover off at the cords or threads which hold it in place by the eyelets G and H and when the cover is ripped clear of the sack 1, the continued descent causes the parachute P to be pulled out of the sack 1 by its ring E, attached by the light rope 12, and the cords F, to the strong rope 14. As the aviator continues to drop the sack 1, attached to him, is pulled away from the parachute which unfolds naturally and finally the cords D, D, D, D, are drawn out and the rings C, C, C, C, come next to be followed by the strap extensions 8, 9, 10 and 11; the rope ring C² limiting the spread of the rings C, C, C, C, when the aviator for an instant reaches the position shown in Fig. 5. The next instant the light rope 12 breaks and he, with the parachute P drops free of the air-ship, leaving the cover 15 and the rope 14 still clinging to the air-ship Z. The parachute P immediately opens and he descends slowly to earth. In Fig. 2 the relative positions of the strap extensions 8, 9, 10 and 11 with the cords D, D, D, D, is shown dotted at 8ᵇ, 9ᵇ, 10ᵇ and 11ᵇ and D', D', D', D', respectively, as well as the position of the flexible or rope ring C².

In the case of the sack 1ª, shown in Fig. 6, the aviator's assistant wears a belt B² strapped about his chest at all times. This belt has an eye 23 through which is a ring 21. When the assistant wants to leave the air-ship in the air he grabs the bag or sack 1ª by the handle 18 and holds it near his chest while he snaps the hook 21 upon the ring 22. He then jumps out and with the rope 14ª previously attached to the air-ship the cover 15ª will become ripped off in the manner illustrated in Fig. 6 and the parachute with its suspension cords, leaves the bag 1ª in the same manner as that described for the form shown in the other figures; the folding and packing being done in the same way.

There is one difference in the construction wherein all the cords D are fixed to a single ring 20 which is attached to the bottom of the bag 1ª and to the short rope 19 having a looped end 19ª engaging a snap hook 21.

It makes no difference as to whether the aviator jumps out and falls head first or leaves in an upright position, as I have found by personal experience with my invention, the cover 15 or 15ª is ripped off in the manner above described, and the withdrawal and unfolding of the parachute is accomplished in a manner to have the peripheral edge P² remain within the bag 1 until the aviator has fallen the folded length of the body of the parachute marked P² in Fig. 5, which is the peripheral edge of the parachute P. The advantage of bringing the peripheral edge P² of the parachute P to such a distance before the air is allowed to catch and open this parachute body avoids contact with any part of the air-ship during the drop and lends materially to safety.

The pack, as worn by the aviator, serves as a cushion to his back as he sits within his machine.

Having described my invention, I claim:—

1. In a parachute pack device, a sack, means for securing said sack to the body of an aviator, said means comprising a breast belt attachable to said aviator around his breast, straps attached to said sack and said belt passing around the shoulders of said aviator, and other straps attached to said belt and to the lower part of the body of said aviator, a parachute adapted to be folded within said sack, and having its suspension cords attached to said straps, and a cover removably attached to said sack and attached to said parachute, and other means for fixing said cover to the air-craft used by said aviator, whereby upon the falling of said aviator from said air-craft from above the earth, said cover is ripped off said sack, said sack remains with said aviator and said parachute leaves said sack top first and its periphery last and upon the breaking of the attaching means between the cover and the parachute with the aviator attached is launched for its natural opening.

2. In a parachute pack device, including a parachute and its suspension cords, a sack, a harness fixed to both said sack and to said suspension cords, and adapted for attachment to the body of an aviator, said harness comprising body straps attached to said sack, a breast and leg belts attached to said straps, a cover removably attached to said sack, adapted to hold said parachute within, the same in a folded condition, means attaching said cover removably to said parachute and other means for fixing said cover to the air-craft used by said aviator, upon a fall of said aviator from said air-craft, said cover is ripped off from said sack, by virtue of its fixed attachment to said air-craft and the fixed attachment of said sack to said aviator, releasing said parachute and launching the same upon the breaking of the first mentioned means.

LESLIE L. IRVIN.